F. E. LOFSTROM.
BALL AND ROLLER BEARING.
APPLICATION FILED JAN. 7, 1921.
1,420,852.
Patented June 27, 1922.
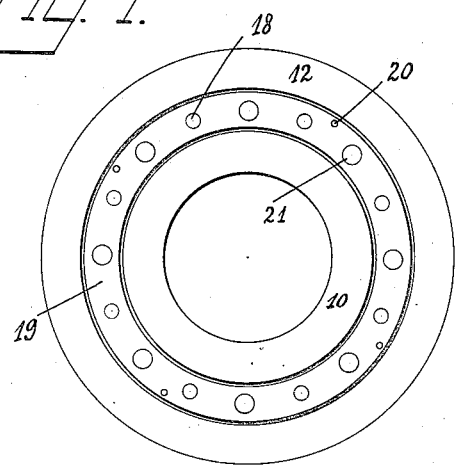
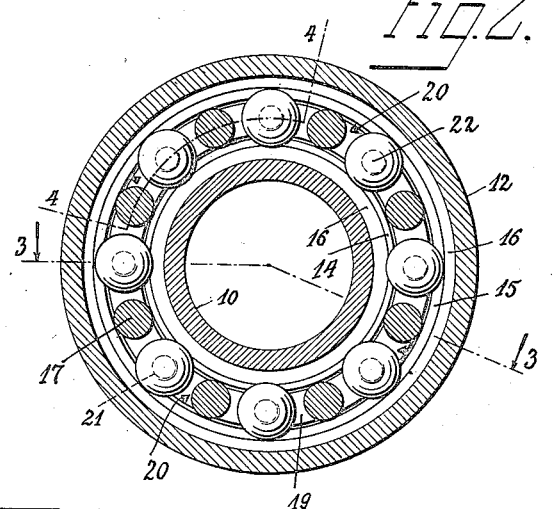
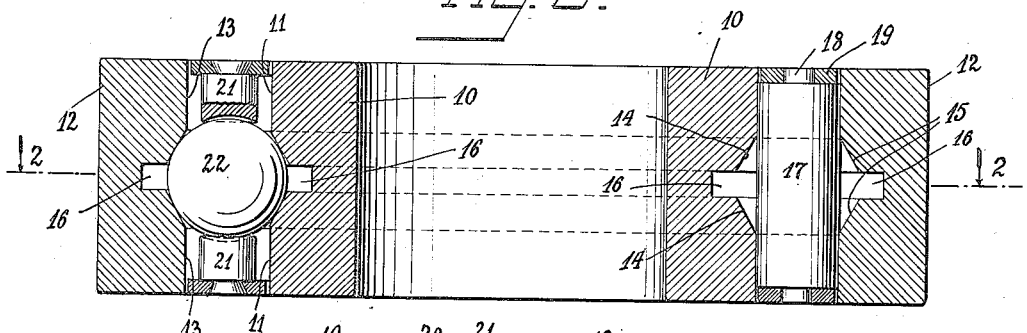
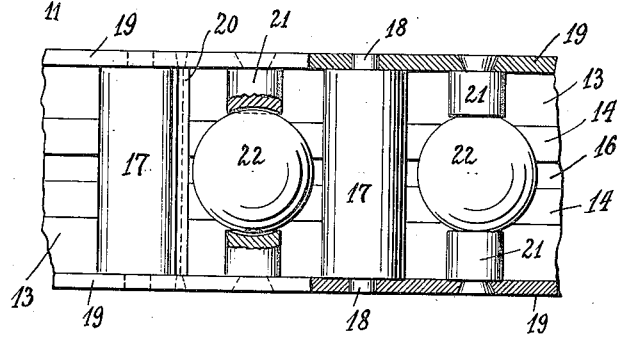
Fredrik E. Lofstrom
INVENTOR.
BY
ATTORNEYS

UNITED STATES PATENT OFFICE.

FREDRIK ELLIS LOFSTROM, OF ELMIRA, NEW YORK.

BALL AND ROLLER BEARING.

1,420,852.

Specification of Letters Patent.

Patented June 27, 1922.

Application filed January 7, 1921. Serial No. 435,629.

*To all whom it may concern:*

Be it known that I, FREDRIK ELLIS LOFSTROM, a citizen of the United States of America, residing at Elmira, county of Chemung, and State of New York, have invented certain new and useful Improvements in Ball and Roller Bearings, of which the following is a specification.

My invention has for its object to provide an improved ball and roller bearing of simple and compact construction, adapted to support considerable loads with ease, to take up radial and axial thrust as well, to reduce friction, and to afford special facility for lubrication.

The invention will now be described in detail with reference to the specific example illustrated by the accompanying drawings, and the novel features will then be pointed out in the appended claims.

In said drawings Fig. 1 is a face view of the improved ball and roller bearing; Fig. 2 is a section thereof perpendicular to the axis of rotation, in the plane indicated by the line 2—2 of Fig. 3, the latter being a section, on an enlarged scale, along the line 3—3 of Fig. 2; and Fig. 4 is a developed view of the ball and roller cage and of the inner member, substantially between the radii indicated at 4—4 in Fig. 2, and partly in section along the arc indicated by the dotted line in Fig. 2, between said radii.

The improved bearing comprises nested inner and outer annular members which are relatively rotatable and interpose bearing balls and rollers carried by a cage loose and rotatable relatively to each of said members. In the particular example illustrated, the inner and the outer members have their opposing surfaces formed similarly, but of course these surfaces are of different diameters.

The inner member 10 has two spaced annular surfaces or roller races 11 forming part of the same cylindrical surface, and the outer member 12 has two similar cylindrical races 13 of the same width and spacing (measured parallel to the axis of rotation) as the surfaces 11. Between the surfaces 11, 13 are located spaced cone surfaces 14, 15 respectively, which form a ball race. The angle at the apex at the cones is about 60° in the case illustrated (or, an angle of 30° between the axis and the generatrix of the cone). Each of the surfaces 14 and the adjacent or companion surface 15 lie between the same planes perpendicular to the axis. In cross section, as shown in Fig. 3, the surfaces 14, 15 of the same pair converge toward the adjacent face or end of the bearing and diverge toward the other pair of surfaces 14, 15. Between the adjacent ends of said spaced surfaces, the members 10, 12 are formed with a relatively deep annular groove 16 of U-shaped or other suitable cross section.

The difference between the radii of the cylindrical races 11 and 13 is sufficient to receive between them cylindrical bearing rollers 17 of a diameter corresponding to such difference. These rollers are formed integral with reduced trunnions 18 journaled in rings 19 of the ball and roller cage. This cage, in addition to the rings 19 which are preferably flush with the ends of the members 10, 12, comprises connecting members 20 riveted or otherwise secured rigidly to the two rings 19. The particular bearing illustrated comprises eight rollers 17, evenly spaced. Between these rollers the cage rings 19 carry pairs of ball-supports 21. The two ball-supports of the same pair are in alignment in a direction parallel with the axis of rotation, but spaced from each other to receive one of the bearing balls 22 between them, the opposing or adjacent ends of the ball supports being formed with cups or sockets of spherical curvature, as shown in Fig. 4. Thus the balls 22, while free to turn or roll, cannot escape from the hold of the supports 21. These supports are shown as cylindrical pins with reduced ends riveted to the cage rings 19. The arrangement and construction of the connecting members 20 may vary; in the drawings I have indicated four such members, at regular intervals, and of triangular cross section (Figs. 2 and 4) with one of the edges of each of these prismatic members directed toward the adjacent ball 22, the purpose being to prevent any jamming of the ball against the inner side of the member 20, it being understood that each ball has a slight play relatively to its supports 21, and the sharp edge facing the ball will form a stop to arrest the ball before it can become jammed under a connecting member 20. Of course, the width of the rings 19 is less than the distance between the opposing cylindrical races 11, 13, so that said rings will not come in contact with the members 10, 12. The balls 22 are of proper diameter to be in contact with the cone surfaces 14, 15 at four points of each ball, said points lying in the same radial plane with reference to the axis of rotation, as will be readily understood by reference to the left-hand portion of Fig. 3.

The inner member 10 may be non-rotatable, as by being fastened to the axle of a vehicle, the outer member 12 in that case rotating, say by being secured to the hub of a wheel. In other cases, the outer member 12 might form part of a stationary bearing, and the inner member 10 might rotate with a shaft or other part supported or journaled in said bearing. In other cases again, both members 10 and 12 might be rotatable about their common axis. In any event, the balls 22 and rollers 17 would be in rolling contact with the cone surfaces 14, 15 and with the cylindrical surfaces 11, 13 respectively during the operation of the rotary part or parts. The rollers 17 would bear most of the radial thrust, and would largely relieve the balls 22 of such radial thrust. The balls 22 will receive the axial thrust so as to prevent longitudinal or axial movement of the members 10 and 12 relatively to each other. The groove 16 will hold a supply of oil or other lubricant, thus insuring an easy motion of the rolling parts. The improved bearing is very strong and well adapted to the needs not only of passenger automobiles, but motor trucks as well and even railroad rolling stock. Of course the bearing may be used in other cases also.

Various modifications may be made without departing from the nature of my invention as defined in the appended claims.

I claim:—

1. A bearing comprising co-axial inner and outer members each of which is provided, in the face directed toward the other member, with a central lubricant-holding groove, with oppositely inclined annular conical ball-races at each side of said groove, and with spaced aligning cylindrical roller-races adjacent to the ends of the ball-races distant from said groove, connected rings co-axial with said members, located between said cylindrical roller races and out of contact therewith, aligning supports toward each other projected from said rings and having ball-sockets at their adjacent ends, balls engaging said seats and said conical ball races, and rollers journaled in said rings and engaging said cylindrical roller races.

2. A bearing comprising co-axial inner and outer members provided in their opposing faces with roller-races located adjacent to opposite end faces of the bearing and spaced from each other, with spaced ball races which spread apart from said roller races, and with lubricant-holding grooves located between the adjacent ends of said ball-races and extending more deeply into said opposing faces of the two members, and a cage located between said members loosely and carrying balls engaging said ball-races and alternating with rollers engaging said roller-races.

3. In a bearing, a cage consisting of connected rings and aligning supports projected toward each other from said rings and having ball-sockets at their adjacent ends, rollers journaled in said rings and of a diameter exceeding the width of the rings so as to project therefrom, balls held by said socketed supports and of greater diameter than the rollers, and co-axial inner and outer members having races for said balls and rollers.

4. In a bearing, a cage comprising connected rings, rollers carried by said rings and of a diameter exceeding the width of the rings so as to project therefrom, balls of a greater diameter than the rollers, supported by said cage, and co-axial inner and outer members having races for said balls, and, at each side of said ball-races, races for said rollers.

5. In a bearing, a cage comprising connected rings, rollers carried by said rings and of a diameter exceeding the width of the rings so as to project therefrom, balls supported by the cage and located about midway between said rings, and co-axial inner and outer members having races for said rollers and balls, and provided with annular lubricant-holding grooves adjacent to the ball-races.

6. In a bearing, a cage comprising rings, alternating balls and rollers carried loosely by said cage, members connecting said rings and provided with edges directed toward the adjacent ball and co-axial inner and outer members having races for said balls and rollers.

7. In a bearing, a cage, rollers engaged with said cage, balls located between said rollers, and cupped members projecting from said cage and localizing said balls between said rollers.

In testimony whereof I have affixed my signature.

FREDRIK ELLIS LOFSTROM.